ORNAMENTED STOCKING

Original Filed March 28, 1950 2 Sheets-Sheet 1

INVENTOR:
William H. Lorimer,
BY Paul & Paul
ATTORNEYS.

ORNAMENTED STOCKING

Original Filed March 28, 1950 2 Sheets-Sheet 2

INVENTOR:
William H. Lorimer,
BY Paul & Paul
ATTORNEYS.

United States Patent Office

Re. 23,965
Reissued Mar. 22, 1955

23,965

ORNAMENTED STOCKING

William H. Lorimer, Burlington, N. C., assignor to Lorimer Hosiery Mills, Inc., Burlington, N. C.

Original No. 2,633,722, dated April 7, 1953, Serial No. 152,444, March 28, 1950. Application for reissue January 26, 1955, Serial No. 484,140

6 Claims. (Cl. 66—180)

Matter enclosed in heavy brackets [ ] appears in the original patent but forms no part of this reissue specification; matter printed in italics indicates the additions made by reissue.

This invention relates to ornamented hosiery and to methods of producing such hosiery. More specifically, it is concerned with ornamented half hose or men's stockings having design figures of relatively large areas of diamond configuration, as for example, in what are known as "Argyle" socks. Authentic hosiery of the kind referred to is expensive due to the necessity for its production, by reciprocatory knitting, on flat knitting machines which are slow in operation and hence restricted in their output.

My invention has for its chief aim to provide ornamented stockings of simpler construction having the design characteristics of real Argyle hosiery, and also to provide an improved method by which stockings so improved can be expeditiously produced in quantity at very much less cost.

How the foregoing objectives are realized in practice will appear from the following detailed description of the attached drawings, wherein Fig. 1 is a view in side elevation of ornamented stocking conveniently embodying my invention.

Figure 1:
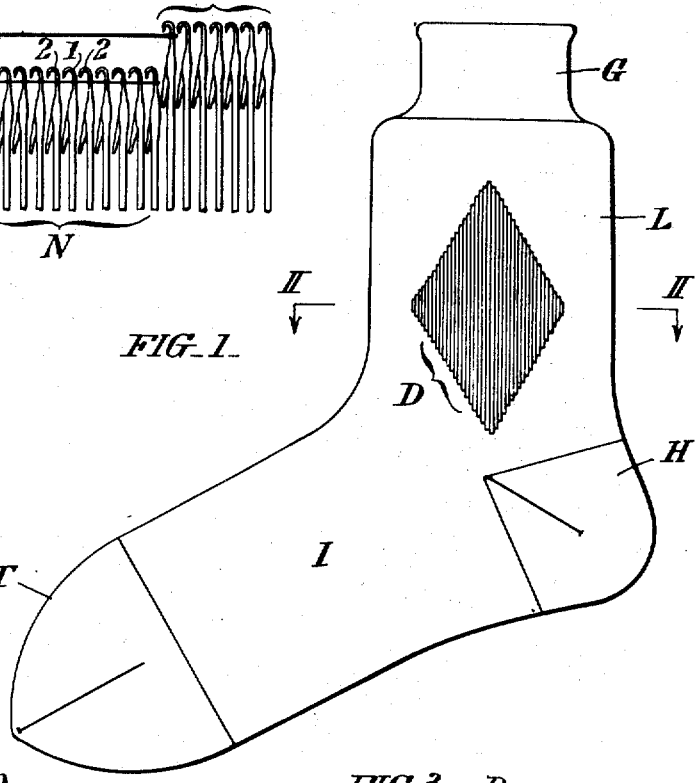
Figure 2:
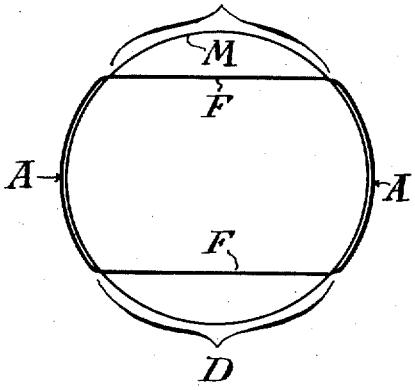
Figs. 2 and 3 are diagrammatic views in cross section taken as indicated by the angled arrows II—II in Fig. 1 showing the results of successive steps in the production of the stocking.
Figure 3:
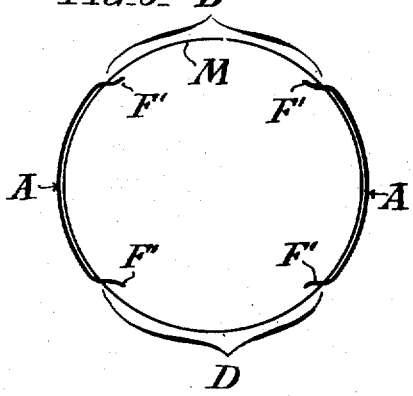

The stocking chosen for convenience of illustration in Fig. 1, has at each side of its leg portion L, a diamond figure of relatively large area *having a coursewise extent of substantially a quadrant, illustrated in Figs. 2 and 3* which contrasts in color from the adjacent areas of the fabric, and so resembles in appearance, a sock of the Argyle type. Except for the formation of the ornamentation, the illustrated stocking may be of the usual seamless construction with an elastic garter top G, and a foot with fashioned heel and toe pockets H and T. To knit the leg and instep portions L and I of the stocking, I employ a main yarn and a contrastingly-colored auxiliary yarn which are respectively designated M and A, in the drawings. While, for the purposes of more ready distinction, these yarns M and A are indicated by light and heavy lines, they may actually be of the same count or weight.

Figure 4:
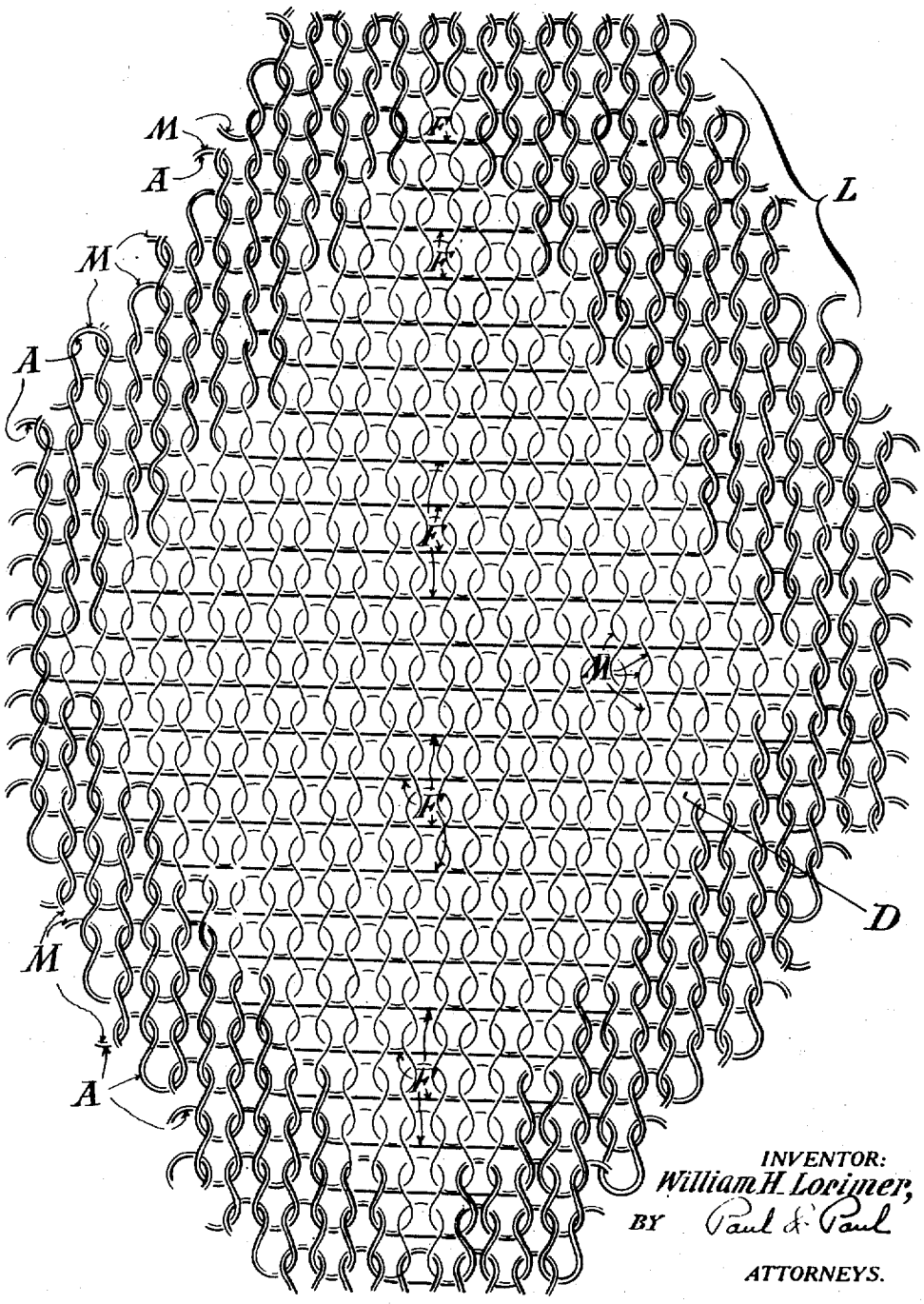
Fig. 4 is a fragmentary view drawn to a larger scale showing the construction of the stocking fabric in the region of one of the ornamental design figures.

In accordance with my invention, the design figure areas D in the leg portion L of the sock, see Fig. 4, are constituted by loops of the main yarn alone, while the intervening and other portions of the leg L as well as the instep portion I are formed from both yarns, with the loops of the auxiliary yarn overlying the loops of the main yarn in plating relation. The color of the auxiliary yarn thus dominates in these plated sections to contrast with the design figures in which only the color of the yarn M appears. Due to the improved method by which the knitting of the sock is carried out as presently explained, floats F (Figs. 2 and 4) of the auxiliary yarn A occur at the inside of the fabric behind the design areas D knitted from the main yarn M alone. These floats I remove by cutting, leaving short ends of sufficient length as at F′ in Fig. 3 which will effectively resist withdrawal incident to circumferential expansion of the sock on the leg of the wearer.

Figure 5:
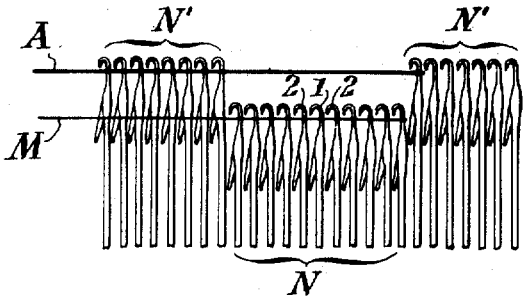
Fig. 5 is a fragmentary view showing, in linear development, a section of needles of circular knitting machines and the manner in which the needles are controlled to determine the formation of the design figures.

The sock can be readily produced on any commercial circular stocking knitting machine having an annular series of needles, at least two yarn feeds, and mechanism capable of selecting individual needles in varying numbers as round and round knitting takes place. In Fig. 5, is shown a portion of the circle of needles of such a machine in linear development *to produce the plain knit leg portion as distinguished from conventional rib knitting in which groups or banks of needles are employed.* The method followed in determining the formation of design figure at each side of the sock in accordance with my invention is as follows: For the first course the center needle 1 of a selective group N assigned for the patterning is relegated to a low level so as to take the main yarn M only, while the remaining needles N′ at the higher take both the auxiliary yarn A and the main yarn. At the third course of the ornamental knitting the needle 2 at each side of the center needle 1 is kept with the latter at the low level to take only the main yarn. This procedure is repeated with addition of end needles to the selective group in every other course of the knitting until the desired maximum width of the design figure is attained, whereafter the process is reversed by subtraction of end needles from the selective group in every other course to the completion of the figure. As a result, the floats F of the auxiliary yarn are gradually increased in length in the first half of each design area, and gradually decreased in length in the other half. In practice the number of needles actually employed in each selective group is of course greater than shown in Fig. 5.

It will be readily understood by those skilled in the art of seamless hosiery knitting that design figures of large area other than of diamond configuration can be produced in accordance with my invention, through different variant selection of the needles assigned to knit the main yarn only. The broader of the appended claims are accordingly to be interpreted with this thought in mind.

Having thus described my invention, I claim:

1. As a new article of manufacture, a plain knit seamless tubular stocking of the Argyle type with a leg portion produced from a main yarn and a contrasting auxiliary yarn, having at opposite sides, relatively large diamond-shaped ornamental areas in each of which the maximum width across corners is at least of quadrant extent, the ornamental areas being constituted by loops of the main yarn only, and the intervening areas being of reinforced fabric in which loops formed from segments of the auxiliary yarn of progressively varying length overlie the loops of the main yarn in plating relation, with the ends of said segments terminating at the edges of the ornamental areas.

2. As a new article of manufacture, a plain knit, seamless tubular stocking of the Argyle type with a leg portion produced from a main yarn and a contrasting auxiliary yarn, having at opposite sides relatively large ornamental areas, each of which has a maximum width of at least quadrant extent, the ornamental areas being constituted by loops of the main yarn only, and the intervening areas being of reinforced fabric in which loops formed from segments of the auxiliary yarn overlie the loops of the main yarn in plating relation, with the ends of said segments terminating at the edges of the ornamental areas.

*3. As a new article of manufacture, a seamless stocking of the Argyle type comprising a plain knit leg portion having substantially diamond-shaped areas on opposite sides thereof each having a maximum coursewise extent of at least a quadrant and consisting of loops of a main yarn only, said areas being separated by contrasting intervening areas each of which consists of loops of two yarns one of which is said main yarn and the other of which is a contrasting yarn knit in plating relation to said main yarn, the edges of the intervening areas terminating at the edges of the first named areas.*

*4. As a new article of manufacture, a seamless stock-*

*ing of the Argyle type comprising a plain knit leg portion having relatively large areas on opposite sides thereof each having a maximum coursewise extent of at least a quadrant and consisting of loops of a main yarn only, said areas being separated by contrasting intervening areas each of which consists of loops of two yarns one of which is said main yarn and the other of which is a contrasting yarn knit in plating relation to said main yarn, the edges of the intervening areas terminating at the edges of the first named areas.*

*5. As a new article of manufacture, a seamless stocking of the Argyle type comprising a plain knit leg portion having substantially diamond-shaped areas on opposite sides thereof each having a coursewise extent of substantially a quadrant and consisting of loops of a main yarn only, said areas being separated by contrasting intervening areas each of which consists of loops of two yarns one of which is said main yarn and the other of which is a contrasting yarn knit in plating relation to said main yarn, the edges of the intervening areas terminating at the edges of the first named areas.*

*6. As a new article of manufacture, a seamless stocking of the Argyle type comprising a plain knit leg portion*

*having relatively large areas on opposite sides thereof each having a coursewise extent of substantially a quadrant and consisting of loops of a main yarn only, said areas being separated by contrasting intervening areas each of which consists of loops of two yarns one of which is said main yarn and the other of which is a contrasting yarn kit in plating relation to said main yarn, the edges of the intervening areas terminating at the edges of the first named areas.*

References Cited in the file of this patent or the original patent

UNITED STATES PATENTS

| | | |
|---|---|---|
| 1,062,910 | Hirner | May 27, 1913 |
| 1,933,681 | Page | Nov. 7, 1933 |
| 2,150,773 | Lawson et al. | Mar. 14, 1939 |
| 2,255,693 | Jones | Sept. 9, 1941 |
| 2,516,697 | Haddad | July 25, 1950 |

FOREIGN PATENTS

| | | |
|---|---|---|
| 41,724 | Norway | Aug. 10, 1925 |